US012802828B2

(12) United States Patent
Owston

(10) Patent No.: US 12,802,828 B2
(45) Date of Patent: Nov. 17, 2026

(54) THERMAL BRIDGE

(71) Applicant: BAE SYSTEMS plc, London (GB)

(72) Inventor: Jeremy Henry Owston, Cumbria (GB)

(73) Assignee: BAE SYSTEMS PLC, London (GB)

(*) Notice: Subject to any disclaimer, the term of this patent is extended or adjusted under 35 U.S.C. 154(b) by 311 days.

(21) Appl. No.: 18/262,621

(22) PCT Filed: Jan. 17, 2022

(86) PCT No.: PCT/GB2022/050086
§ 371 (c)(1),
(2) Date: Jul. 24, 2023

(87) PCT Pub. No.: WO2022/157484
PCT Pub. Date: Jul. 28, 2022

(65) Prior Publication Data
US 2024/0079153 A1 Mar. 7, 2024

(30) Foreign Application Priority Data
Jan. 25, 2021 (GB) .................................... 2100949

(51) Int. Cl.
*G21C 1/12* (2006.01)
*G21C 3/04* (2006.01)
(Continued)

(52) U.S. Cl.
CPC ............... *G21C 1/12* (2013.01); *G21C 3/042* (2013.01); *G21C 5/02* (2013.01); *G21C 5/126* (2013.01);
(Continued)

(58) Field of Classification Search
CPC .................................... G21C 1/07; G21C 1/12
See application file for complete search history.

(56) References Cited

U.S. PATENT DOCUMENTS 3,166,614 A * 1/1965 Taylor ...................... G21C 3/06 976/DIG. 57
3,224,944 A * 12/1965 Turner ..................... G21C 3/04 376/454

(Continued)

FOREIGN PATENT DOCUMENTS

CN 112216407 A * 1/2021 ............. G21C 15/28
CN 112216408 A * 1/2021 ............. G21C 15/28

(Continued)

OTHER PUBLICATIONS

KR-102110210-B1. USPTO translation. May 14, 2020. 조창근. (Year: 2020).*

(Continued)

*Primary Examiner* — Lily C Garner
(74) *Attorney, Agent, or Firm* — Arcane Law PLLC

(57) ABSTRACT

A thermal bridge for improving thermal transfer between a fuel element to a fuel block wherein there is provided a high temperature gas cooled nuclear reactor fuel block comprising a fuel channel and a coolant channel wherein the fuel channel comprises a fuel element, the fuel channel further comprising a thermal bridge thermally linking the fuel element and the fuel channel, wherein the thermal bridge comprises a melting point greater than the working temperature of the fuel block, thereby improving thermal transfer from the fuel element to the fuel block, thereby improving thermal transfer to the coolant channel.

11 Claims, 5 Drawing Sheets

(51) Int. Cl.

| | |
|---|---|
| ***G21C 5/02*** | (2006.01) |
| ***G21C 5/12*** | (2006.01) |
| ***G21C 7/04*** | (2006.01) |
| ***G21C 15/08*** | (2006.01) |
| *G21C 1/07* | (2006.01) |

(52) U.S. Cl.

CPC ............... *G21C 7/04* (2013.01); *G21C 15/08* (2013.01); *G21C 1/07* (2013.01)

(56) References Cited

U.S. PATENT DOCUMENTS

| | | | | | |
|---|---|---|---|---|---|
| 3,274,066 | A * | 9/1966 | Zumwalt | G21C 3/17 | 376/418 |
| 3,275,522 | A * | 9/1966 | Kinsey | G21C 3/06 | 376/310 |
| 3,413,196 | A * | 11/1968 | Fortescue | G21C 3/04 | 976/DIG. 18 |
| 3,793,144 | A * | 2/1974 | Magladry | G21C 7/32 | 376/349 |
| 3,823,067 | A * | 7/1974 | Stern et al. | G21C 21/02 | 976/DIG. 96 |
| 4,030,974 | A * | 6/1977 | Neef | G21C 7/06 | 376/226 |
| 4,060,454 | A * | 11/1977 | Miertschin | G21C 3/28 | 376/427 |
| 4,073,834 | A * | 2/1978 | Mysels | G21C 21/02 | 376/901 |
| 4,076,775 | A * | 2/1978 | Hackstein | G21C 3/64 | 376/427 |
| 4,131,511 | A * | 12/1978 | Mordarski | G21C 3/16 | 376/418 |
| 4,202,849 | A * | 5/1980 | Miertschin | G21C 3/28 | 976/DIG. 57 |
| 4,252,691 | A * | 2/1981 | Lipp | G21F 1/06 | 250/517.1 |
| 4,316,771 | A * | 2/1982 | Lee | G21C 3/20 | 376/415 |
| 11,919,815 | B2 * | 3/2024 | Terrani | C04B 35/573 | |

FOREIGN PATENT DOCUMENTS

| | | | | |
|---|---|---|---|---|
| CN | 117133493 A * | 11/2023 | G21C 21/02 |
| EP | 2896046 A1 | 7/2015 | |
| ES | 3003308 T3 * | 3/2025 | G21C 21/02 |
| GB | 924095 A * | 4/1963 | G21C 3/20 |
| GB | 1230520 A * | 5/1971 | G21C 21/02 |
| GB | 2021844 A | 12/1979 | |
| GB | 2065955 A | 7/1981 | |
| WO | 2014043335 A1 | 3/2014 | |
| WO | 2022157484 A1 | 7/2022 | |

OTHER PUBLICATIONS

Owston, Jeremy Henry. “Reactivity analysis of a direct nuclear heated gas turbine with nitrogen coolants.” Nuclear Engineering and Design 355 (2019): 110355. (Year: 2019).*

General Atomics, 1996. GT-MHR: Conceptual Design Description Report. San Diego, Calif. IAEA, 2005. Management of high enriched uranium for peaceful purposes: Status and trends. Vienna. (Year: 1996).*

International Search Report and Written Opinion received for PCT/GB2022/050086, mailed Jun. 24, 2022. 14 pages.

GB Search Search Report under Section 17(5) received for GB application No. 2100949.3, dated Oct. 25, 2021. 4 pages.

* cited by examiner

THERMAL BRIDGE

BACKGROUND

High temperature gas cooled nuclear reactors are graphite-moderated Generation IV reactors which commonly use a fuel element such as uranium or plutonium in combination with an inert gas coolant to achieve very high outlet temperatures (commonly in excess of 700 °C). Such HTGR's have been developed over the last 50 years of which two continue to be operational; the HTTR operated by the Japan Atomic Energy Agency and HTR-10 operated by Tsinghua University in China.

HTGR's may be used in combination with a direct cycle design such that coolant flows through the reactor core and is used to extract work energy, for example via turbomachinery, without the need for a secondary coolant loop or associated heat exchanger as is common in the art. Such designs are highly efficient and allow the overall reactor size to be minimised thus making their application especially suitable in restricted spaces, for example aircraft, ships and submarines.

The coolant fluid most commonly employed within HTGR direct cycle reactors is helium as this possesses significant advantages over alternative gases, namely that the gas is inert thereby making the design inherently safe in the event of coolant leakage. Helium however, presents difficulties in converting the high temperature gas into work energy due the immaturity of current turbomachinery designs suited to helium. Such design immaturity represents a significant commercial barrier to exploitation of helium based direct cycle gas reactors due to the high cost outlay in designing and building such a reactor and associated turbomachinery.

Further, the efficiency of the reactor is reduced by a fuel channel gap between the fuel element and the fuel channel. The fuel channel gap exists to accommodate manufacturing tolerance errors in the manufacture of the fuel element in addition to thermal volumetric changes of the fuel block due to different rates of expansion of the fuel block and fuel element, which occur due the heat generation, fission product build up and neutron irradiation over time.

DESCRIPTION

According to a first aspect, there is provided a high temperature gas cooled nuclear reactor fuel block comprising a fuel channel and a coolant channel wherein the fuel channel comprises a fuel element, the fuel channel further comprising a thermal bridge thermally linking the fuel element and the fuel channel, wherein the thermal bridge comprises a melting point greater than the working temperature of the reactor fuel block, thereby improving thermal transfer from the fuel element to the fuel block, thereby improving thermal transfer to the coolant channel. The high temperature gas reactor is taken to mean working temperatures at or above 600 °C Low conductivity inert gases such as nitrogen can be readily used with existing commercial off the shelf (COTS) turbomachinery designs thereby reducing the initial cost outlay of designing and building such a reactor. However, the use of nitrogen as a coolant gas presents a trade off in thermal transfer between the fuel element and the coolant due to the lower thermal conductivity value of nitrogen 0.025 W/mK compared to helium 0.15 W/mK. In order to achieve the same thermal duty, the mass flow of nitrogen needs to be significantly increased in order to achieve the same work output of helium.

In the prior art the fuel channel typically comprises the fuel element located therein, and there is a fuel channel gap between the fuel element and the walls that form the fuel channel. This gap allows for expansion, as previously described above.

This fuel channel gap deficiency, whilst not significant in helium cooled reactors due to helium's higher thermal conductivity, represents a significant thermal barrier where nitrogen is used as the reactor coolant. This is due nitrogen having a lower thermal conductivity compared to helium, hence a reduced coolant outlet temperature is achieved with nitrogen, thereby reducing the overall efficiency of the reactor.

The nuclear reactor fuel block, fuel element, fuel channel and coolant channel may be of any design compatible with high temperature gas cooled nuclear reactors. One such example is the General Atomics® GT-MHR. The GT-MHR fuel block comprises a hexagonal cross section, in which there is provided a plurality of fuel channels and coolant channels extending in the normal axis from the hexagonal plan face wherein a coolant gas is flowed through the coolant channels in order to absorb heat generated by the fuel element in use.

The fuel block may be made from any suitable material, which provides a suitable neutron moderator comprising a low neutron absorption cross-section, for example beryllium or graphite, more preferably graphite. The plan face of the fuel block may be of any suitable shape, for example circular, square, rectangular, pentagonal, hexagonal octagonal or any higher sided shape. Whilst in the example of the GT-MHR the fuel block, this comprises a hexagonal plan face. Preferably, the plan face shape of the fuel block allows a plurality of fuel blocks to tessellate in a reactor. The fuel element is a material capable of undergoing and sustaining nuclear fission within the reactor. The fuel element may be a fissile material, for example uranium or plutonium including their salts, such as, for example oxides, dioxides or carbides of these elements, for example uranium oxide, plutonium oxide, uranium dioxide, plutonium dioxide or uranium carbide. The fuel may be a mixture of oxides to create a mixed oxide fuel (MOX). The fuel may be a tristructural-isotropic (TRISO) or quadstructural-isotropic (QUADRISO) fuel comprising a fuel kernel of uranium or plutonium oxide coated with layers of isotropic materials. Such isotropic materials may be selected from graphitic carbons or ceramics, for example pyrolytic carbon or silicon carbide. Such fuels are structurally resistant to neutron irradiation, corrosion and oxidation due to the isotropic layers present on the fuel kernel and can therefore withstand higher operating temperatures making their application ideal for high temperature gas cooled reactors. Furthermore, such properties enhance the safety characteristics of the reactor as the fuel element will not melt, even beyond highest operating temperature of the reactor i.e. a meltdown is not possible. The fuel element may be provided in a grain like, granular consistency which may be compacted into fuel compacts, for example, pebble compacts for use in a particular fuel rod assembly. Preferably, the fuel is a TRISO fuel.

In the present arrangement, the thermal bridge thermally links the fuel element and the fuel channel. The thermal bridge significantly increases the heat transfer between the fuel element and the fuel channel by filling the fuel channel gap with the thermal bridge, thereby improving thermal transfer from the fuel element to the fuel block. This has the effect of improving the overall heat transfer to the coolant channel without the need to increase the mass flow of the coolant to achieve the same thermal efficiency thereby improving the efficiency of the reactor as a whole.

In order to efficiently transfer heat between the fuel element and fuel channel where the reactor commonly operates at a working temperature in the range of from 600 °C to 2000 °C, the thermal bridge comprises a melting point greater than the working temperature of the reactor fuel block. Preferably, the thermal bridge is a solid above 600 °C. Preferably, the thermal bridge is a solid above 1000 °C. More preferably, the thermal bridge is a solid up to 2000 °C In use, the fuel block and fuel element may expand and contract due to temperature changes within the reactor, for example, when the reactor is in use, i.e. during fission and when the reactor is offline. The fuel block and channel may also further expand and contract due to a build up of fission products and neutron irradiation over time. The fuel element and fuel channel also expand and contract at different rates to each other. As such, the thermal bridge may be resiliently compressible in order to accommodate the volumetric changes of the fuel block, fuel channel and fuel element. Such resilience allows the thermal bridge to remain in thermal contact ie abut the fuel element and the fuel channel simultaneously during expansion and contraction of the fuel block, fuel channel and fuel element without the creation of an air gap which would otherwise reduce the thermal transfer between the fuel element and the coolant channel.

The thermal bridge is a solid, it is conceivable that the thermal bridge may be a liquid or a gas. However, it will be appreciated that there may be significant manufacturing challenges in containing a compressible liquid or gas within the fuel block. The rapid expansion of a contained fluid would in itself present an explosion hazard. Further, a fluid may penetrate microscopic cracks within the fuel block caused by neutron irradiation which may undermine the integrity of the fuel block. Preferably, the thermal bridge is a solid.

The thermal bridge may be a block of resilient material, a foamed material or a powdered material or mixtures thereof. Preferably, the thermal bridge is a powdered material.

The thermal bridge may preferably be a powdered material, the powdered material may be particles, which may be spherical, rounded, angular, flaked, cylindrical, acicular, cubic, or irregular. Preferably, the particles may be spherical.

The particle size of the powdered material may be in the range of from 0.1 to 500 μm, preferably 1 to 200 μm, more preferably less than 100 μm and more preferably in the range of from 1 to 100 μm, the value determined by the average longest dimension of the particle. The thermal bridge may comprise multi-modal or bi-modal size distributions of particles.

The thermal bridge may be made from any material comprising a low neutron cross section and a high thermal conductivity for example metals and their alloys, metalloids, carbon or thermally conductive ceramics. Preferably, the thermal bridge may be made from a material selected from the group comprising molybdenum (isotopes 92 and 94), niobium, silicon carbide or carbon (graphite). More preferably the thermal bridge is made from graphitic carbon.

The thermal bridge may contain only graphitic powder.

The present inventors have found that graphitic materials are readily commercially available, low cost, high melting point, high thermal conductivity and low neutron cross section. Moreover, graphite has a reduced hazard compared to liquid sodium cooled reactors as graphite will not combust on contact with air or water.

The fuel channel gap may further comprise a burnable poison. Said burnable poisons comprise a high neutron cross section such that they readily absorb neutrons caused by excess reactivity at the beginning of a nuclear fuel's life. The presence of the burnable poison decreases over the lifetime of the reactor as the poison is 'burned', i.e. absorbs neutrons.

The burnable poison may be selected from a group comprising compounds of boron or gadolinium. Preferably, the burnable poison is boron carbide.

The burnable poison may be part of the thermal bridge or may be separate from the thermal bridge but co-deposited in the fuel channel gap, for example a discreet layer adjacent to the thermal bridge surrounding the fuel element. Where the burnable poison is part of the thermal bridge, the thermal bridge and burnable poison may be a homogenous blend of powder particulates. Preferably, the thermal bridge comprises the burnable poison.

The thermal bridge may contain only boron carbide as the thermal bridge and burnable poison.

Preferably, the thermal bridge comprises a graphitic powder with the boron carbide as the burnable poison, preferably as a homogenous blend of powder particulates.

According to a second aspect, there is provided a high temperature gas cooled nuclear reactor system comprising a fuel block as herein defined.

The coolant channel of the high temperature gas cooled nuclear reactor system fuel may comprise a gas that may be readily used in gas turbines, to allow conventional gas turbine machinery to use the coolant gas without the need for modifying the machinery. One such preferred gas is nitrogen. It is a lower conductivity gas compared to helium (thermal conductivity lower than 0.1 W/mK at 25 °C).

The arrangement can use helium, however it would require either a heat exchanger to use conventional gas turbine machinery or modified machinery suitable for receiving helium. Conversely, the present inventors have found that the use of nitrogen within a high temperature gas cooled reactor is compatible with existing gas turbines, which use air as the working fluid, thus its application is especially useful for direct cycle high temperature gas cooled reactors.

The high temperature gas cooled reactor system may comprise direct cycle system. Such systems negate the need for a secondary coolant circuit and associated heat exchangers and can instead utilise only a primary loop wherein the gas travels through the reactor, is heated, and then directly drives turbo machinery.

According to a third aspect, there is provided a method of improving cooling in a high temperature gas cooled reactor as herein defined, the method comprising the steps of;

I) providing a thermal bridge between the fuel element and the fuel channel; and, II) providing a coolant flow in the coolant channel;

II) such that in use, the thermal bridge improves heat transfer between the fuel element and the fuel block, IV) thereby improving heat transfer to the coolant flow in the coolant channel.

The thermal bridge may be inserted into the fuel channel during the manufacturing stage of the fuel block or inserted in-situ within the reactor after insertion of the fuel block.

According to a further aspect, there is provided a direct cycle high temperature nitrogen cooled reactor system comprising a fuel block, the fuel block comprising; a fuel channel and a coolant channel, wherein the fuel channel comprises a fissile material, the fuel channel further comprising a thermal bridge in the form of graphite powder, thermally linking the fissile material and the fuel channel, wherein the thermal bridge comprises a melting point greater than the working temperature of the reactor's fuel block, the thermal bridge further comprising a burnable poison in the form of boron carbide, thereby improving thermal transfer from the fuel element to the fuel block.

FIGURES

Several arrangements of the invention will now be described by way of example and with reference to the accompanying drawings of which;

Figure 1:
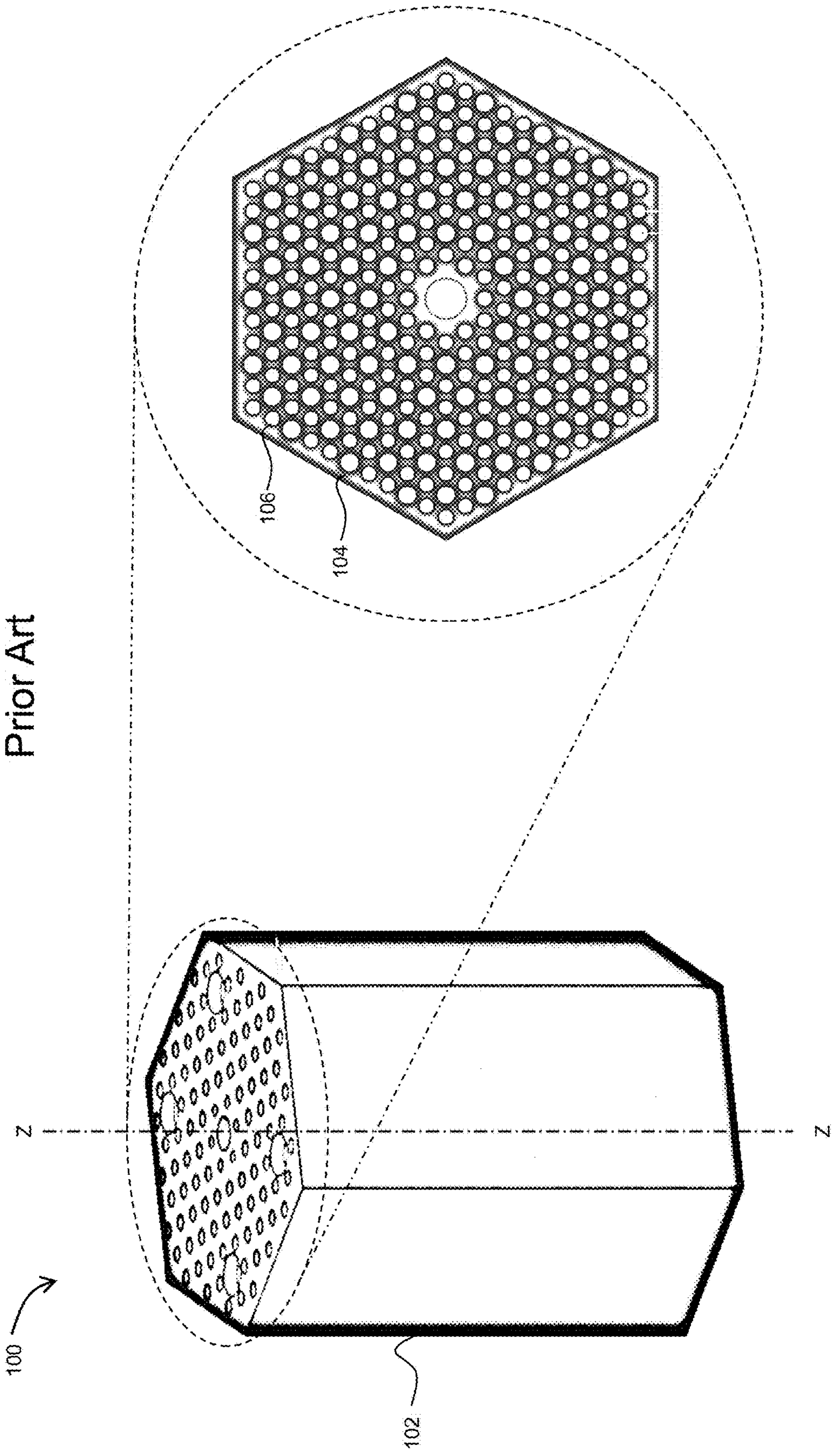
FIG. 1 shows an arrangement of a high temperature gas cooled reactor fuel block.

Turning to FIG. 1, there is provided an example of a fuel block arrangement 100 in the prior art. In this particular example, the fuel block 102 is a General Atomics GT-MHR high temperature gas cooled nuclear reactor fuel block comprising a plurality of fuel channels 106 and a coolant channels 104 wherein the fuel channels 106 comprise a plurality of fuel elements (not shown). The fuel block 102 comprises a hexagonal cross section which allows a plurality of adjacent fuel blocks (not shown) to tessellate in a reactor core. In use, a coolant gas flows in the longitudinal axis Z defined by the fuel channels 106 and coolant channels 104 extending through the fuel block 102. The coolant gas also flows in the gaps between the fuel channel 106 and the fuel elements as there is a fuel channel gap provided to allow thermal expansion and neutron irradiation expansion of the fuel element and fuel channel 106 in addition to accommodation manufacturing tolerance errors of the fuel element.

Figure 2:
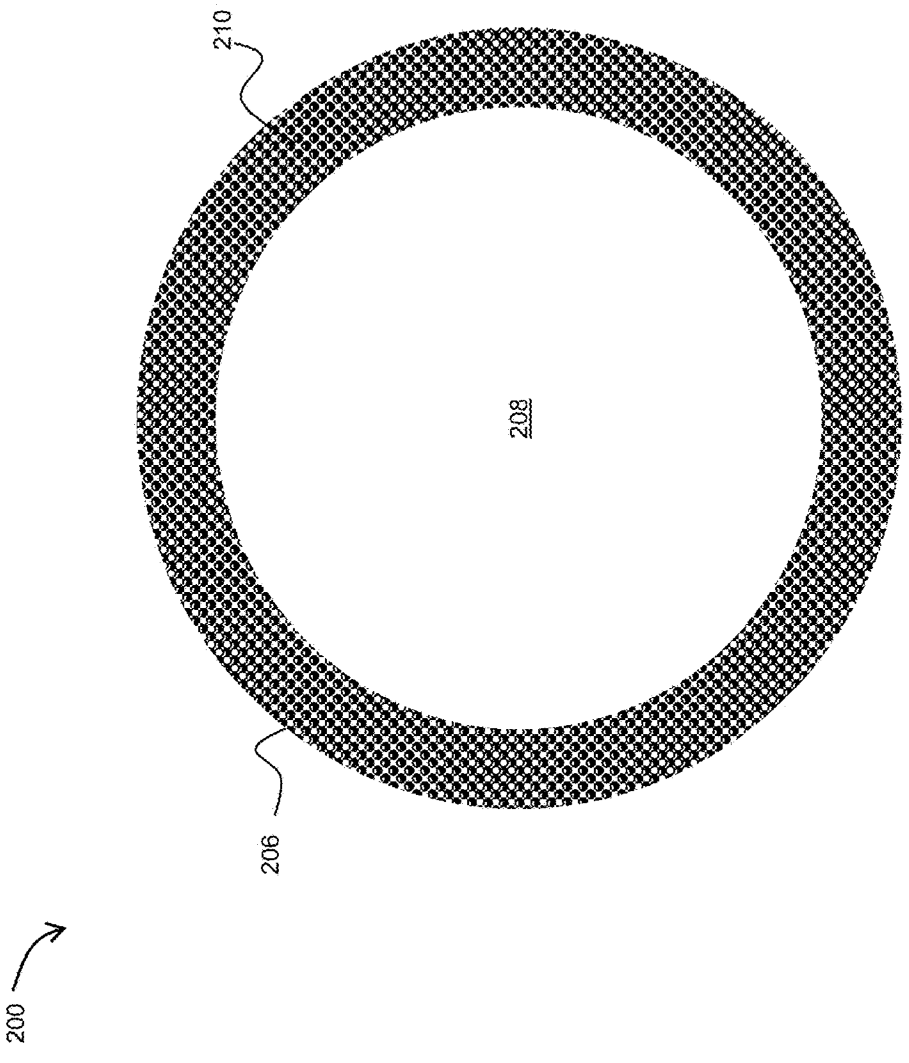
FIG. 2 shows a plan view of a fuel channel comprising a fuel element packed with a thermal bridge according to the invention.

Turning to FIG. 2, there is provided a plan view arrangement 200 of a fuel channel 206 comprising a fuel element 208, the fuel element 208 surrounded by a thermal bridge 210. In the present arrangement, the fuel element 208 is a TRISO uranium oxide based fissile material compacted into a cylindrical compact, and the fuel channel 206 is made of graphite. In the present arrangement, the thermal bridge is a solid graphite powder with a spherical particle size of 50 um packed around the fuel element. In the present arrangement, the thermal bridge 210 is resiliently compressible owing to gaps between powder particles thereby allowing thermal expansion and contraction of the fuel block, fuel channel and fuel element and volumetric changes of the fuel channel due to neutron irradiation. The thermal bridge 210 further comprises a burnable poison (not shown) in the form of boron carbide which helps offset additional reactivity of the fuel element 208 at the beginning of its life, the poison gradually burning over its lifetime as neutrons are absorbed.

Figure 3:
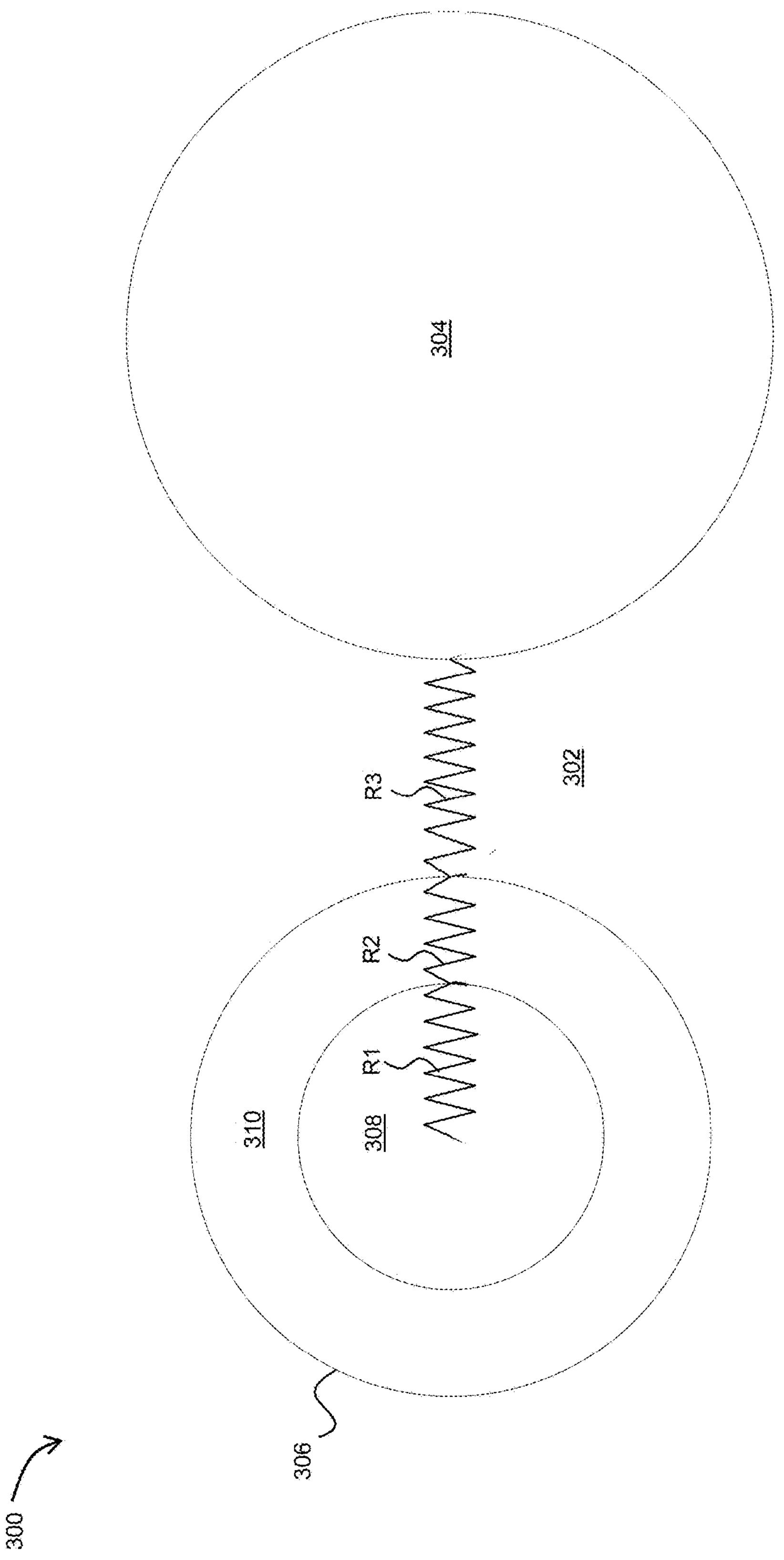
FIG. 3 shows a thermal conductivity diagram of a fuel channel to a coolant channel.

Turning to FIG. 3, there is provided a thermal conductivity diagram 300 between a fuel channel 306 and a coolant channel 304. In use, the fuel element 308 produces thermal energy due to fission upon splitting of the fissile product, for example uranium 235. This thermal energy must be transferred from the centre of the fuel element 308 to the edge of the fuel element 308 denoted by resistance R1. Without a thermal bridge, the heat must then traverse a fuel channel gas gap denoted by resistance R2. This gas gap is filled with the coolant gas which also flows through the coolant channel 304. Such a gap significantly reduces the thermal transfer between the fuel element 308 and the fuel channel wall 306 due to the low thermal conductivity of the cooling gas relative to the fuel block 302 and fuel compact 308. The transferred heat then traverses the fuel block 302 having a resistance of R3 to the coolant channel 304 wherein coolant gas is heated by convection. In the present invention, resistance R2 is significantly reduced due to the provision of a thermal bridge 310 which is in effect an extension of the fuel block to abut the fuel element 308. In this example, the resistance of R3 is greater than R2 due to the provision of voids between graphite particles in the thermal bridge. In practice, the resistance R2 may be slightly higher than R3 due to very small gaps between powder particles in the thermal bridge 310. Where R2 is a thermal bridge 310, the resistance is always lower than if R2 were merely a coolant gas therefore it can be seen that heat transfer is vastly improved between the fuel element 308 to the coolant channel 304 by provision of a thermal bridge 310.

Figure 4:
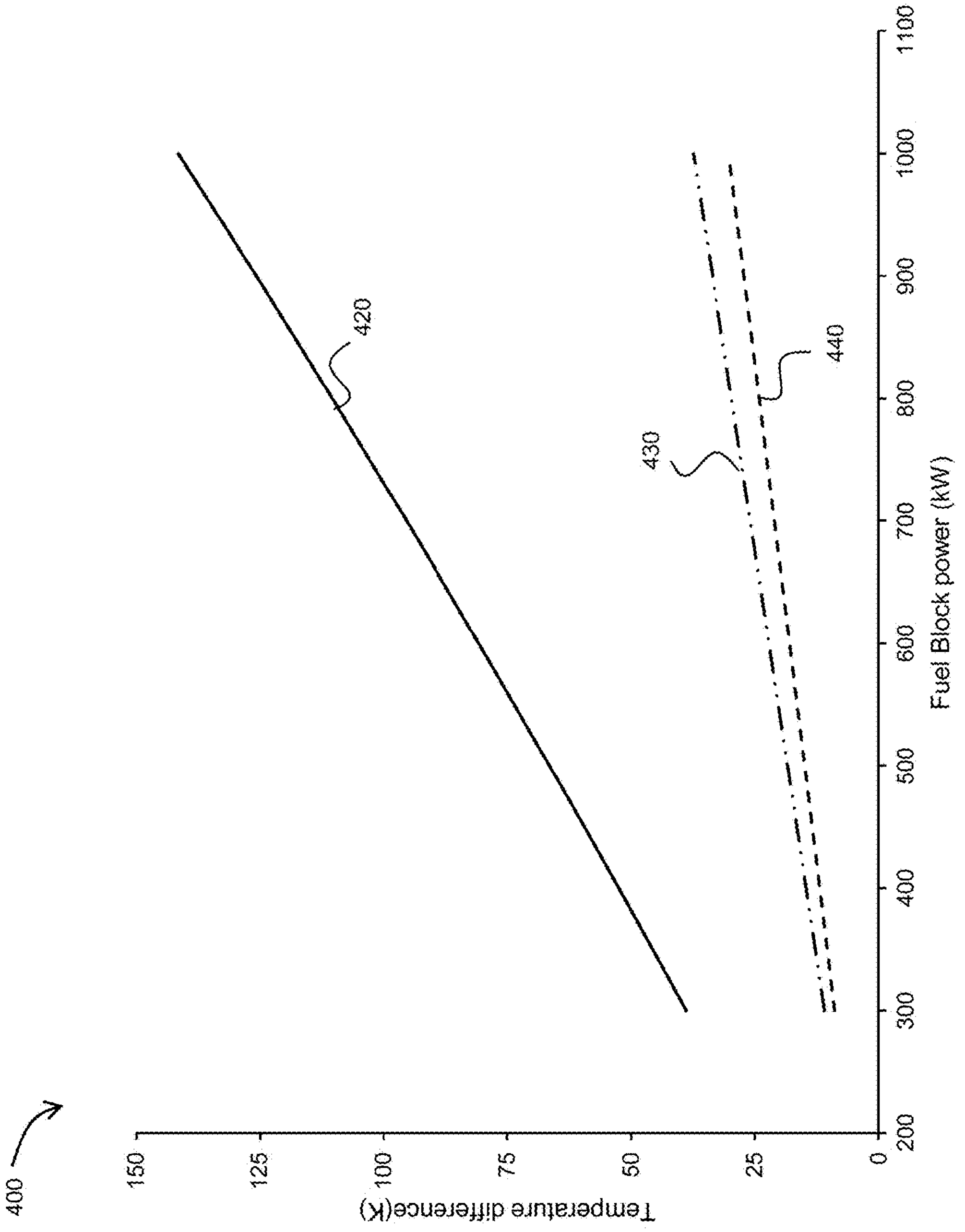
FIG. 4 shows a graph comparing nitrogen coolant with and without a thermal bridge versus helium gas coolant without a thermal bridge

Turning to FIG. 4, there is provided a graph 400 comparing nitrogen coolant with and without a thermal bridge versus helium gas coolant without a thermal bridge. The Y axis shows a difference in kelvin between the fuel element and the fuel channel wall plotted against an X axis of fuel block power in kilowatts. Line 420 denotes a fuel block without any thermal bridge utilising nitrogen as a coolant gas. Line 430 denotes a fuel block without any thermal bridge utilising helium as a coolant gas. Line 440 denotes a fuel block with a thermal bridge of the present invention utilising nitrogen as a coolant gas. As can be seen from the graph 400, the utilisation of a nitrogen coolant without a thermal bridge 420 is significantly less efficient than a helium coolant without a thermal bridge 430 owing to the nitrogen possessing a thermal conductivity of around $1/6^{th}$ that of helium. As such, there is shown a significant temperature difference across the fuel channel gap as a function of fuel block power. Where a simulation is run using a thermal bridge with a nitrogen coolant 440, it can be seen that the temperature difference is less than that of the high conductivity helium coolant therefore the use of a thermal bridge can yield higher thermal efficiencies than use of a helium coolant alone and much more efficient than a nitrogen coolant without a thermal bridge 420.

Figure 5:
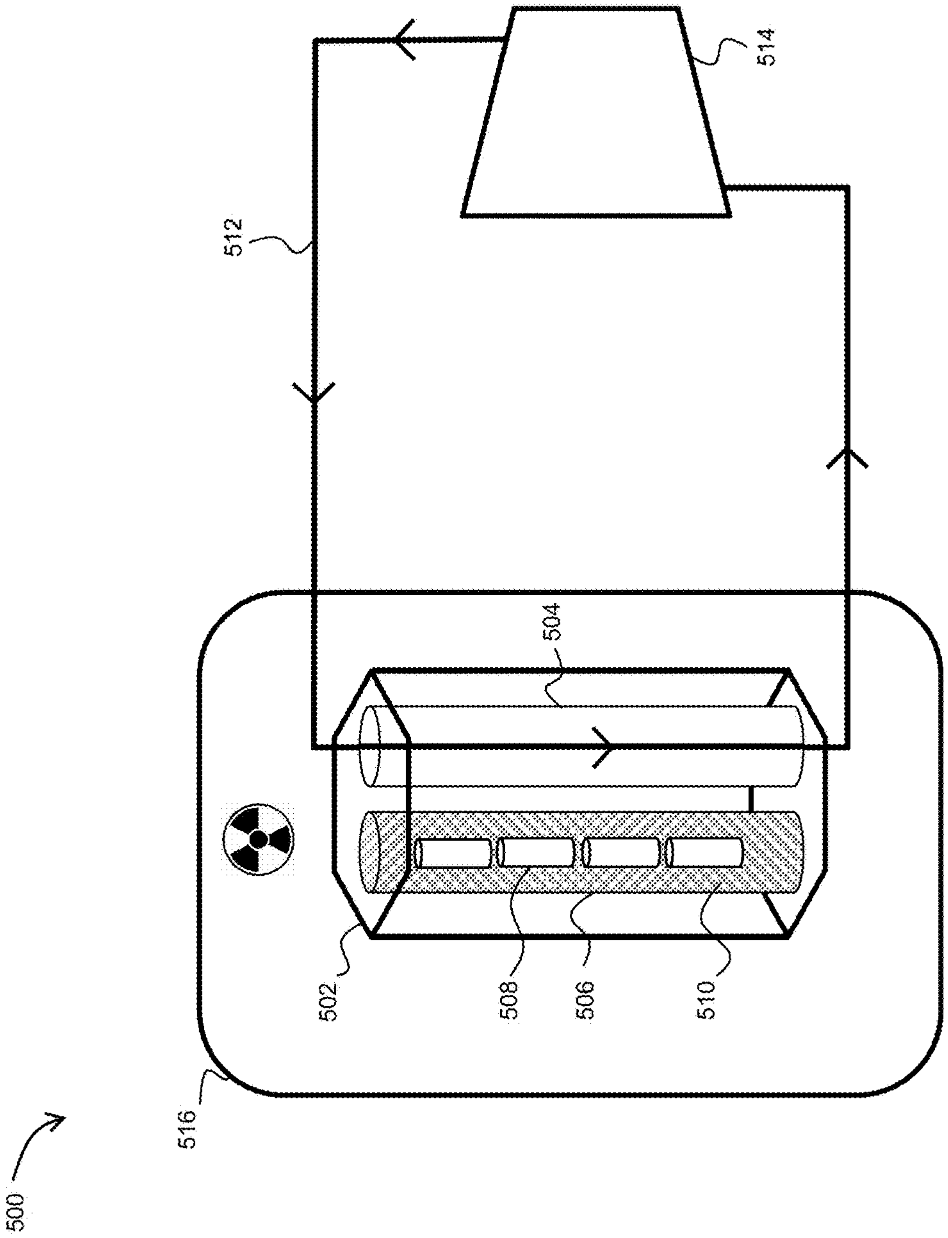
FIG. 5 shows a high temperature gas cooled reactor system.

Turning to FIG. 5, there is provided a high temperature gas cooled reactor system 500 comprising a reactor 516, the reactor comprising at least one graphite fuel block 502. In the present invention, the graphite fuel block 502 is a General Atomics® GT-MHR fuel block comprising a fuel channel 506 and a coolant channel 504 wherein the fuel channel comprises a plurality of TRISO fuel elements 508, the fuel elements 508 formed into cylindrical capsules mounted in series within the fuel channel 506. The fuel channel 306 further comprises a thermal bridge 510 which surrounds each fuel element 508 wherein the thermal bridge is a graphite powder. In the present arrangement, the high temperature gas cooled reactor system 500 is a direct cycle system wherein there is provided a primary circuit loop 512 which directly drives turbomachinery 514 without the need for a secondary coolant loop or associated heat exchangers. In this example, the coolant gas is nitrogen.

Although a few preferred arrangements have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing arrangement(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A high temperature gas cooled nuclear reactor fuel block comprising:
- a fuel channel;
- a fuel element located within the fuel channel;
- a fuel channel gap between the fuel element and a wall of the fuel channel;
- a thermal bridge surrounding the fuel element and within the fuel channel gap and simultaneously abutting the fuel element and the wall of the fuel channel, so as to thermally link the fuel element and the fuel channel; and
- a coolant channel;
- wherein the thermal bridge comprises consists of (i) a solid graphite powder or (ii) a solid graphite powder and a burnable poison, the solid graphite powder having gaps between each of a plurality of particles of the solid graphite powder, thereby thermally linking the fuel channel and the fuel element and allowing thermal expansion and contraction of the fuel block, the fuel channel, and the fuel element and volumetric changes of the fuel channel due to neutron irradiation, the solid graphite powder having a melting point greater than a working temperature of the reactor fuel block.

2. The high temperature gas cooled nuclear reactor fuel block according to claim 1, wherein the the particles of the solid graphite powder have one or more particle sizes within the range of 1 μm to 100 μm.

3. The high temperature gas cooled nuclear reactor fuel block according to claim 1, wherein the burnable poison is boron carbide.

4. A high temperature gas cooled nuclear reactor system comprising the fuel block according to claim 1.

5. The high temperature gas cooled nuclear reactor system according to claim 4, wherein the coolant channel comprises a gas having a thermal conductivity lower than 0.1 W/mK at 25 °C.

6. The high temperature gas cooled nuclear reactor system according to claim 5, wherein the gas is nitrogen.

7. The high temperature gas cooled reactor system according to claim 4, wherein the reactor system is a direct cycle system.

8. The high temperature gas cooled nuclear reactor fuel block according to claim 1, wherein the thermal bridge comprises metals and their alloys, metalloids, carbon, or thermally conductive ceramics.

9. The high temperature gas cooled nuclear reactor fuel block according to claim 1, comprising a compound of boron or gadolinium, adjacent to the thermal bridge.

10. A method of improving cooling in a high temperature gas cooled reactor system that includes a coolant channel and a fuel channel, the method comprising:
- providing a fuel element within the fuel channel so as to provide a fuel channel gap between the fuel element and a wall of the fuel channel; and
- providing a thermal bridge surrounding the fuel element and within the fuel channel gap, such that the thermal bridge simultaneously abuts the fuel element and the wall of the fuel channel, so as to thermally link the fuel element and the fuel channel, thereby improving thermal transfer from the fuel element to the coolant channel;
- wherein the thermal bridge consists of (i) a solid graphite powder or (ii) a solid graphite powder and a burnable poison, the solid graphite powder having gaps between each of a plurality of particles of the solid graphite powder, thereby thermally linking the fuel channel and the fuel element and allowing thermal expansion and contraction of the fuel block, the fuel channel, and the fuel element and volumetric changes of the fuel channel due to neutron irradiation, the solid graphite powder having a melting point greater than a working temperature of the reactor fuel block.

11. A fuel block of direct cycle high temperature nitrogen cooled reactor system, the fuel block comprising:
- a fuel channel;
- a fissile material located within the fuel channel so as to provide a fuel channel gap between the fissile material and a wall of the fuel channel;
- a thermal bridge surrounding the fissile material and within the fuel channel gap and simultaneously abutting the fissile material and the wall of the fuel channel, so as to thermally link the fissile material and the fuel channel, the thermal bridge consisting of a solid graphite powder and boron carbide, the solid graphite powder having gaps between each of a plurality of particles of the solid graphite powder, thereby thermally linking the fuel channel and the fuel element and allowing thermal expansion and contraction of the fuel block, the fuel channel, and the fuel element and volumetric changes of the fuel channel due to neutron irradiation; and
- a coolant channel;
- wherein the thermal bridge has a melting point greater than a working temperature of the fuel block.

* * * * *